United States Patent

[11] 3,607,162

[72] Inventors: Gerd Edzard Bockstiegel; Peter Hack, both of Ranzel, Germany
[21] Appl. No.: 686,280
[22] Filed: Nov. 28, 1967
[45] Patented: Sept. 21, 1971
[73] Assignee: Dynamit Nobel AG, Troisdorf, Bezirk Cologne, Germany
[32] Priority: Dec. 2, 1966
[33] Germany
[31] D 51688

[54] PROCESS FOR THE MANUFACTURE OF A ZIRCONIUM OXIDE AND ALUMINUM OXIDE ABRASIVE OF HIGH GRIT TOUGHNESS
4 Claims, No Drawings

[52] U.S. Cl. .................................................. 51/309, 51/293, 106/57, 106/65
[51] Int. Cl. ............................................... B24d 3/02

[50] Field of Search ........................................... 51/309, 293; 106/57, 65

[56] References Cited
UNITED STATES PATENTS

| | | | |
|---|---|---|---|
| 2,383,035 | 8/1945 | Baumann | 51/309 |
| 2,961,296 | 11/1960 | Fenerty | 51/309 |
| 3,175,894 | 3/1965 | Foot | 51/309 |
| 3,181,939 | 5/1965 | Marshall | 51/309 |
| 1,240,491 | 9/1917 | Saunders et al. | 51/309.1 |
| 3,428,443 | 2/1969 | Davis | 51/309 |

Primary Examiner—Donald J. Arnold
Attorney—Burgess, Dinklage & Sprung

ABSTRACT: Substantially pore-free abrasive grit comprising zirconium oxide mixed with alumina or bauxite made by mixing the components together in molten form in the substantial absence of nitrogen.

PROCESS FOR THE MANUFACTURE OF A ZIRCONIUM OXIDE AND ALUMINUM OXIDE ABRASIVE OF HIGH GRIT TOUGHNESS

Abrasives for the rough grinding of steel ingots, castings or the like consist mainly of corundum which is fused in electric furnaces. This material is characterized by great hardness. The quality of an abrasive is determined not only by its hardness but also by its "grit toughness" and by its chemical behavior during the grinding process in which extremely high temperatures can occur at the contact surface between the grit and the workpiece.

Grit toughness is a property of the material in itself, on the one hand, but on the other hand it is also a property that depends on the form of the individual abrasive grains. For example, a chunky grain is tougher than a slender or flakelike grain. Also, pores and voids within a grain make for a poorer grit toughness in comparison with a void-free, dense grain.

Abrasive materials that are relatively advantageous in relation to corundum are mixtures of zirconium oxide and alumina or bauxite fused in the electric furnace. The chemical reaction between an abrasive grit made of such a raw material and such materials as iron and similar metals and the oxides thereof is slighter at the high-grinding temperatures than it is in the case of a pure electrocorundum grit.

Also, the grit toughness, which to a great extent determines the useful life of a grinding wheel, is considerably greater in this oxide mixture than it is in electrocorundum. By the useful life of a grinding wheel is meant the ratio between the weight of the material removed from the workpiece and the weight of the material lost from the grinding wheel.

Upon further examining abrasives of the prior art on the basis of zirconium oxide and aluminum oxide, however, it is found that the grains used as abrasive grits contain in part many very fine pores and voids, but even these fine defects in the abrasive grains have an adverse effect on grit toughness.

It is therefore an object of this invention to provide an abrasive grit material which is substantially free of pores and voids.

It is another object of this invention to provide a novel process of producing abrasive grit.

Other and additional objects of this invention will become apparent from a consideration of this entire specification including the claims hereof.

In accord with and fulfilling these objects, one aspect of this invention resides in a process of producing abrasive grit by melting together zirconium oxide and alumina and/or bauxite under conditions such that nitrogen is substantially excluded from contact with the melt.

Surprisingly, it has now been found that the formation of these fine pores and the resultant reduction of grit toughness can be prevented if the molten material is shielded against contact with atmospheric nitrogen.

The subject of the invention, therefore, is a process for the manufacture of a zirconium oxide and aluminum oxide abrasive grit of high grit toughness by the melting together of zirconium oxide and aluminum oxide and/or bauxite, followed by cooling and comminution of the hardened material, which is characterized by the fact that contact with nitrogen is prevented insofar as possible during the casting and the hardening of the material. Atmospheric nitrogen can be kept away from the molten material in many ways according to the process of the invention.

In one exemplary procedure, 0.5 to 4 percent, and preferably 2 percent, of reducing carbon, such as coke or anthracite coal, is added in granulated form to the fused material in the furnace before it is cast. This carbon floats on the molten material during the melting process, and the carbon monoxide gas that evolves therefrom prevents contact between the molten material and the atmospheric nitrogen during the melting and casting processes.

In another exemplary procedure, contact with atmospheric nitrogen is prevented by shielding the melt with introduced carbon dioxide gas. In this procedure, the mold is first scavenged with carbon dioxide before pouring in the molten material. During the casting process, and all during the solidification period, carbon dioxide continues to be fed into the mold, so that access to air is substantially excluded.

It will be appreciated that substantially any other technique for excluding contact between nitrogen and the molten and solidifying alumina/zirconia is also within the scope of this invention.

EXAMPLE 1

The following mixture of raw materials was fused together in an arc furnace:
580 kg. of aluminum oxide
420 kg. of zirconium oxide.

About 15 minutes before the molten mixture was poured into iron molds, 20 kg. of granulated coke having a grain size of about 10 mm. was added to it. After solidification, the zirconia/alumina mold was crushed in a mill and graded through a sieve into various grits. Grit toughness was then determined by the ball-mill process wherein a very narrowly classified grit is produced from the abrasive grit by passing it through sieves on a test-screening machine, and is ground in a ball mill under defined conditions until one-third of the material passes through a certain sieve. The number of ball-mill rotations needed for this purpose is considered to be the grit toughness index.

In the abrasive grit manufactured by the method of the invention the following indexes were measured:

| Grit No. | Grit Toughness Index |
|---|---|
| 14 | 5,010 |
| 16 | 4,170 |
| 20 | 3,010 |

(Note: The grit numbers are based on "FEPA-Korngrossen-Standard fur Schleifmittelkorn zur Herstellung von Schleifkorpern, Kornung 8–240" [FEPA Grain-Size Standard for Abrasive Grits for the Manufacture of Grindstones, Grits 8 to 240], 2nd Ed., Germany 1964, published by the "Fachverband Elecktrokorund-und Siliziumkarbid-Hersteller e.V." [association of electrocorundum and silicon carbide manufacturers].

For material manufactured in an identical manner but without the addition of carbon these values were as follows:

| Grit No. | Grit Toughness Index |
|---|---|
| 14 | 3,050 |
| 16 | 2,590 |
| 20 | 2,170 |

EXAMPLE 2

The following mixtures of raw materials were melted together in an arc furnace under a carbon dioxide atmosphere.
580 kg. aluminum oxide
420 kg. zirconium oxide.

Before the molten material was poured into the mold, the mold was first scavenged out with a powerful blast of carbon dioxide. During the pouring and also during the solidification of the melt, carbon dioxide continued to be blown into the mold to shield it.

After the solidification, crushing and sorting into grits, the following values were measured:

| Grit No. | Grit Toughness Index |
|---|---|
| 14 | 3,610 |

The grit toughness of chemically identical material made by the same process but without carbon dioxide shielding amounted to 3,050.

This invention will be illustrated by the following examples which are in no way limiting upon the scope of this invention.

What is claimed is:

1. In the process of producing abrasive grit having high grit toughness, which grit contains zirconium oxide and aluminum oxide which process comprises melting and mixing zirconium oxide and aluminum oxide; cooling and solidifying the melt, and crushing the thus solidified melt; the improvement which comprises carrying out said melting, cooling and solidifying under a carbon dioxide shield prior to full solidification thereof.

2. The improved process claimed in claim 1 wherein reducing carbon is introduced into said mixed melt.

3. The improved process claimed in claim 2 wherein said reducing carbon is at least one member selected from the group consisting of coke and anthracite coal.

4. The improved process claimed in claim 1 wherein the weight ratio of zirconium oxide to aluminum oxide is about 4 to 6.